United States Patent
Abzarian et al.

(10) Patent No.: US 10,656,760 B2
(45) Date of Patent: May 19, 2020

(54) REPLAY OF RECORDED TOUCH INPUT DATA

(71) Applicant: Microsoft Technology Licensing, LLC, Redmond, WA (US)

(72) Inventors: David Abzarian, Kenmore, WA (US); Narasimhan Raghunath, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/446,959

(22) Filed: Mar. 1, 2017

(65) Prior Publication Data

US 2018/0253181 A1   Sep. 6, 2018

(51) Int. Cl.
| | | |
|---|---|---|
| G06F 3/041 | (2006.01) | |
| G06F 3/044 | (2006.01) | |
| G06F 3/039 | (2013.01) | |
| G06F 11/22 | (2006.01) | |

(52) U.S. Cl.
CPC ............ *G06F 3/0418* (2013.01); *G06F 3/039* (2013.01); *G06F 3/044* (2013.01); *G06F 11/2221* (2013.01)

(58) Field of Classification Search
USPC .......................... 345/173, 174, 178, 168, 175
See application file for complete search history.

(56) References Cited

U.S. PATENT DOCUMENTS

| | | | |
|---|---|---|---|
| 8,874,396 B1 | 10/2014 | Olson et al. | |
| 2010/0141594 A1* | 6/2010 | Kim | G06F 3/03545 345/173 |
| 2011/0012855 A1 | 1/2011 | Yeh et al. | |
| 2011/0115816 A1* | 5/2011 | Brackney | G06Q 10/06 345/629 |
| 2012/0262407 A1 | 10/2012 | Hinckley et al. | |

(Continued)

FOREIGN PATENT DOCUMENTS

| | | |
|---|---|---|
| WO | 2014137919 A1 | 9/2014 |
| WO | 2015160752 A1 | 10/2015 |

OTHER PUBLICATIONS

Schwarz, et al., "Probabilistic Palm Rejection Using Spatiotemporal Touch Features and Iterative Classification", In Proceedings of the 32nd Annual SIGCHI Conference on Human Factors in Computing Systems, Apr. 26, 2014, 4 pages.

(Continued)

*Primary Examiner* — Thuy N Pardo
(74) *Attorney, Agent, or Firm* — Fiala & Weaver P.L.L.C.

(57) ABSTRACT

In aspects of replay of recorded touch input data, a computing device can store recorded touch input data that has been previously recorded based on multiple instances of user inadvertent contact on touch-enabled devices. A replay test application is implemented to test one or more user devices for inadvertent contact rejection using the recorded touch input data, such as to test a palm rejection algorithm of a user device. The replay test application is implemented to communicate the recorded touch input data to a screen overlay device that generates touch inputs on a touchscreen of the user device to test the palm rejection algorithm of the user device. The replay test application also monitors the user device for an action responsive to a touch input that is not filtered as an inadvertent contact with the touchscreen of the user device.

20 Claims, 6 Drawing Sheets

(56) References Cited

U.S. PATENT DOCUMENTS

| | | | |
|---|---|---|---|
| 2013/0135218 A1* | 5/2013 | Jain | G06F 3/0488 |
| | | | 345/173 |
| 2013/0328810 A1* | 12/2013 | Li | G06F 3/043 |
| | | | 345/173 |
| 2013/0328832 A1* | 12/2013 | Boumgarten | G06F 3/0418 |
| | | | 345/174 |
| 2014/0176498 A1 | 6/2014 | Yanase et al. | |
| 2014/0223421 A1 | 8/2014 | Carter et al. | |
| 2014/0247246 A1* | 9/2014 | Maus | G06F 1/1632 |
| | | | 345/174 |
| 2014/0250430 A1 | 9/2014 | Proud | |
| 2014/0285457 A1 | 9/2014 | Zotov et al. | |
| 2014/0306903 A1 | 10/2014 | Huang et al. | |
| 2014/0309775 A1 | 10/2014 | Jenkinson | |
| 2015/0091820 A1 | 4/2015 | Rosenberg et al. | |
| 2015/0185923 A1* | 7/2015 | Yoon | G06F 3/044 |
| | | | 345/174 |
| 2015/0277666 A1* | 10/2015 | Jansson | G06F 3/0416 |
| | | | 345/175 |
| 2015/0338982 A1* | 11/2015 | Dufva | G06F 3/023 |
| | | | 345/168 |
| 2015/0363041 A1* | 12/2015 | Zeliff | G06F 3/044 |
| | | | 345/173 |
| 2016/0246440 A1 | 8/2016 | Ardakani | |
| 2016/0291764 A1* | 10/2016 | Herring | G06F 3/0416 |
| | | | 345/174 |
| 2016/0306483 A1* | 10/2016 | Files | G06F 3/03545 |
| | | | 345/174 |

OTHER PUBLICATIONS

"Handwriting in OneNote for iPad and OCR everywhere", Published on: Feb. 19, 2015 Available at: https://blogs.office.com/2015/02/19/handwriting-drawing-image-search-onenote-ipad/.

Kendrick, James, "Inking iPad App Penultimate Gets Palm Rejection", Published on: May 22, 2010 Available at: https://gigaom.com/2010/05/22/inking-ipad-app-penultimate-gets-palm-rejection/.

Thurrott, Paul, "Hands-on with the Shipping Version of Surface Hub", Published on: Apr. 11, 2016 Available at: https://www.thurrott.com/mobile/microsoft-surface/66246/hands-shipping-version-surface-hub.

"International Search Report & Written Opinion Issued in PCT Application No. PCT/US2018019301", dated May 14, 2018, 12 Pages.

* cited by examiner

REPLAY OF RECORDED TOUCH INPUT DATA

BACKGROUND

Many people have mobile devices, such as mobile phones, tablet devices, and laptop computers that have integrated display touchscreens. Generally, a user of any of these touchscreen-enabled devices can interact with a device by touch input on the touchscreen, such as with finger contact on the touchscreen or with a digital pen, stylus, or other writing-type input device. Most touchscreen devices include a palm rejection solution which is intended to filter out inadvertent contact with the touchscreen, such as when a user rests a part of a hand and/or fingers on the touchscreen while intending a touch input with a digital pen or stylus device. Rather than accepting the inadvertent contact as a touch input from the user intending to initiate some related device action, such as a cursor movement or button selection, the palm rejection solution can reject the hand and/or fingers contact on the touchscreen as inadvertent contact. Otherwise, the inadvertent contact may be processed through to the operating system of the device, and an unwanted device action may then be initiated.

The many different manufacturers of the various types of devices implement palm rejection solutions and features differently. For example, some use host-based processing for software solutions, some use firmware solutions, while others use proprietary solutions. There is no standardized system for competitive analysis of palm rejection performance for these various, different types of current and upcoming devices. Testing the palm rejection solutions and features of devices that have an integrated display touchscreen is an arduous process, and it is not possible to objectively test and measure how effective the palm rejection is for most touch metrics, such as latency, jitter, and finger separation. Current testing techniques simply employ a diverse demographic of users who come together to use a device and comment on how well the device responds to intended contact and inadvertent contact with the touchscreen. This type of testing is not overly accurate, and not scalable or repeatable.

SUMMARY

This Summary introduces features and concepts of replay of recorded touch input data, which is further described below in the Detailed Description and/or shown in the Figures. This Summary should not be considered to describe essential features of the claimed subject matter, nor used to determine or limit the scope of the claimed subject matter.

Replay of recorded touch input data is described. In aspects, a computing device, such as a mobile phone or tablet device, includes an integrated display touchscreen with sensors that are enabled to detect touch inputs on the touchscreen. The computing device implements a touch detection application that includes a palm rejection algorithm designed to evaluate touch inputs on the touchscreen of the device. The palm rejection algorithm of the touch detection application can determine whether a touch input on the touchscreen is an input to initiate an action with the computing device, or whether the touch input is an inadvertent contact on the touchscreen, such as when a user rests the side of his or her hand on the touchscreen while intending a touch input with a digital pen or stylus device. The hand contact on the touchscreen can be differentiated from the touch input with the digital pen, and the palm rejection algorithm can reject the hand contact as inadvertent contact.

In aspects of replay of recorded touch input data, the recorded touch input data can be recorded based on multiple instances of user inadvertent contact on one or more touch-enabled devices, which are devices independent of the computing device that is being tested. The recorded touch input data can be recorded as only unintentional contacts on the touch-enabled devices. The recorded touch input data can then be applied as the unintentional contacts to test the palm rejection algorithm of the touch detection application for inadvertent contact rejection in a computing device. The recorded touch input data can be applied as an objective, repeatable test of the palm rejection algorithm of the touch detection application.

A screen overlay device receives the recorded touch input data from a test manager device that obtains and stores the recorded touch input data. The screen overlay device is placed over the integrated display touchscreen of the computing device to be tested, and the screen overlay device generates the touch inputs on the touchscreen to test the palm rejection algorithm of the touch detection application for inadvertent contact rejection. The recorded touch input data emulates touch patterns that approximate multiple instances of user inadvertent contact on the touchscreen of the computing device. The recorded touch input data further emulates motion and/or intensity of the touch patterns that approximate the multiple instances of user inadvertent contact on the touchscreen.

The touch detection application of the computing device that is being tested can receive sensor data of the touch inputs as the recorded touch input data is applied to test the palm rejection algorithm of the touch detection application for inadvertent contact rejection. The palm rejection algorithm of the touch detection application can then determine, for each of the touch inputs, whether a touch input is inadvertent contact with the touchscreen, and reject the touch inputs that are determined as the inadvertent contact with the touchscreen.

In other aspects of replay of recorded touch input data, the test manager device that obtains and stores the recorded touch input data implements a replay test application that is designed initiate communication of the recorded touch input data to the screen overlay device that generates the touch inputs on the touchscreen of computing device that is being tested. The replay test application is also implemented to monitor the computing device for an action responsive to a touch input that is not filtered as an inadvertent contact with the touchscreen of the user device, which is an indication that the palm rejection algorithm did not properly reject one of the test touch inputs as inadvertent contact with the touchscreen.

BRIEF DESCRIPTION OF THE DRAWINGS

Aspects of replay of recorded touch input data are described with reference to the following Figures. The same numbers may be used throughout to reference like features and components that are shown in the Figures.

DETAILED DESCRIPTION

Figure 1:
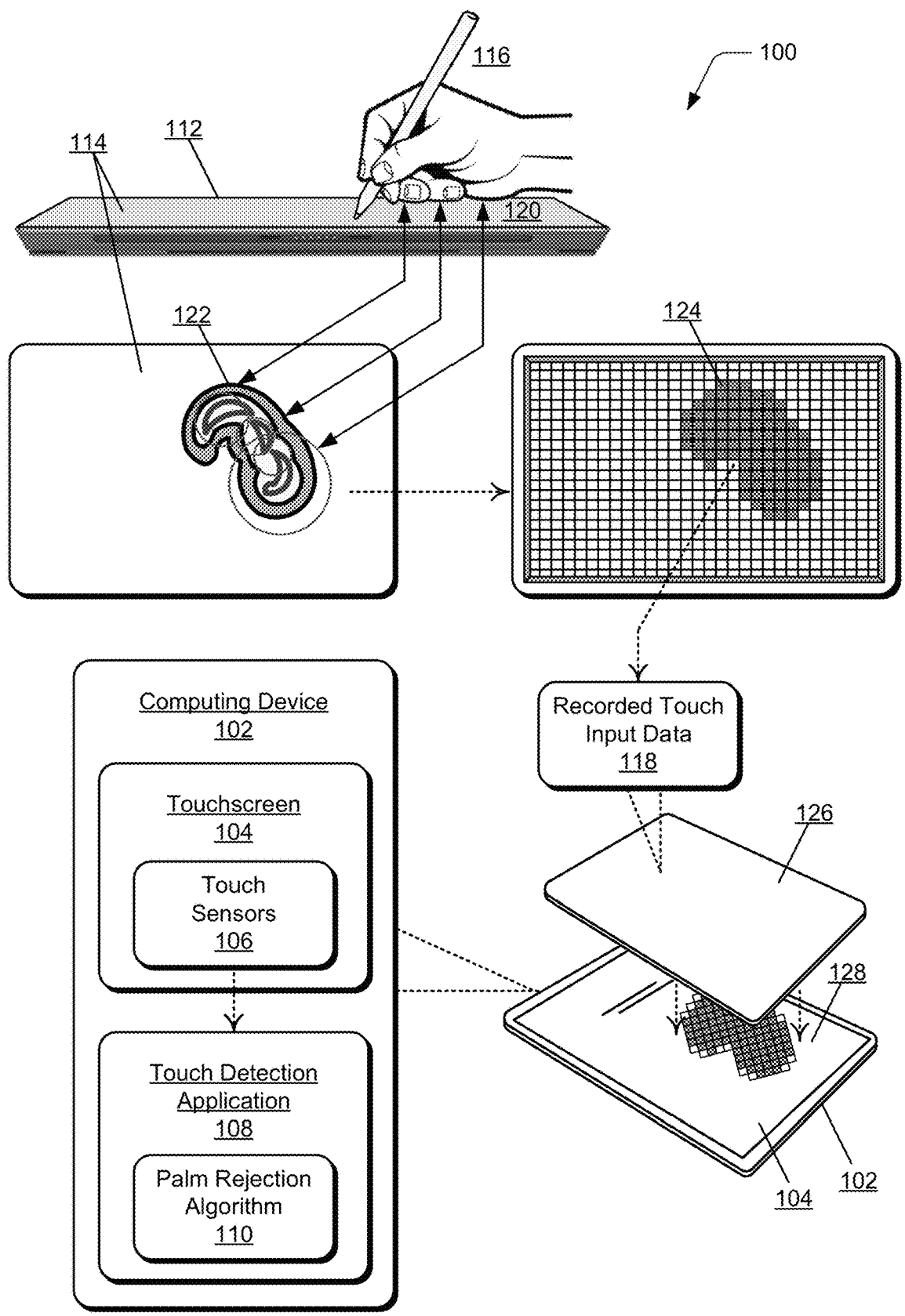
FIG. 1 illustrates an example system in which aspects of replay of recorded touch input data can be implemented as described herein.

Aspects of replay of recorded touch input data are described, such as to implement an objective, repeatable test of the palm rejection solutions in touchscreen-enabled computing devices from the many different manufacturers of the various types of devices that implement palm rejection solutions and features differently. The many types of devices can include computing devices with an integrated display touchscreen, such as any type of mobile phone, tablet device, communication device, gaming device, media device, or other type of computing device that includes an integrated display touchscreen. The recorded touch input data can be captured as touch contact data on one or several touchscreen-enabled computing devices, and the captured touch contact data can be applied to test the palm rejection solution of a computing device that has a touchscreen. The captured touch contact data is normalized for use across the various types of devices and can be used to objectively test the different palm rejection solutions and features that may be implemented by the different devices.

The recorded touch input data emulates a palm and/or fingers that contact a touchscreen of the computing device being tested as inadvertent contact with the touchscreen, such as to emulate when a user with a digital pen or stylus device intends to initiate an input on the touchscreen with the input device. The palm and/or fingers contact on the touchscreen can be differentiated from the touch input with the digital pen or stylus device, and a palm rejection algorithm or solution can reject the palm and/or fingers contact as inadvertent contact with the touchscreen of the computing device. Otherwise, the inadvertent contact that is not detected and rejected may be processed through to the operating system of the computing device, and an unwanted device action may then be initiated, such as a cursor movement, button selection, or other type of user interface initiated action.

The described techniques for replay of recorded touch input data provides a way to capture the inadvertent palm and/or finger contact data from a diverse set of users, and replay the captured data on any touch-enabled device with minimal human intervention, providing scalability and standardized testing to uniformly test the many different, various types of devices. The palm postures of the diverse set of users on the different types of devices varies over the diverse demographics of the different users, such as between left and right-handed users, men and women, adults and children, and the like. These many variations can be captured as the recorded touch input data, and then applied to test the many different types of computing devices that have touchscreens on a device-agnostic basis.

While features and concepts of replay of recorded touch input data can be implemented in any number of different devices, systems, networks, environments, and/or configurations, aspects of replay of recorded touch input data are described in the context of the following example devices, systems, and methods.

FIG. 1 illustrates an example system 100 in which aspects of replay of recorded touch input data can be implemented. The example system 100 includes a computing device 102 with an integrated display touchscreen 104 that has touch sensors 106 to detect touch inputs on the touchscreen. The computing device 102 may be any type of mobile phone, tablet device, communication device, gaming device, media device, or other type of computing device that includes an integrated display touchscreen. The computing device 102 implements a touch detection application 108 that includes a palm rejection algorithm 110 designed to evaluate touch inputs on the touchscreen 104 of the computing device. The touch detection application 108 and palm rejection algorithm 110 can be implemented as software applications or modules, such as computer-executable software instructions that are executable with a processing system of the computing device 102. Although shown and described herein as a software algorithm, the palm rejection algorithm 110 may be implemented in different configurations in different types of computing devices, such as in software, in firmware, in hardware, and/or in silicon of the computing device.

The touch detection application 108 of the computing device 102 can receive input from the touch sensors 106 of the touchscreen 104 when touch contact is detected on the touchscreen 104. The touch sensors 106 may be implemented as any type of sensors, to include capacitive sensors, optical sensors, other types of sensors, and/or any combination thereof. The palm rejection algorithm 110 of the touch detection application 108 can then determine whether a touch input on the touchscreen 104 is an input to initiate an action with the computing device, or whether the touch input is inadvertent contact on the touchscreen. Inadvertent contact with the touchscreen 104 can occur when a user rests the side of his or her hand, or fingers, on the touchscreen while intending a touch input with a digital pen or stylus device. The hand or finger contact on the touchscreen 104 can be differentiated from the touch input with the digital pen, and the palm rejection algorithm 110 can reject the hand and/or finger contact as inadvertent contact. Otherwise, as noted above, the inadvertent contact may be processed through to the operating system of the computing device 102, and an unwanted device action may then be initiated, such as a cursor movement, button selection, or other type of user interface initiated action.

The example system 100 also includes a touch-enabled device 112, which is representative of various types of user devices, such as mobile phones, tablet devices, communication devices, gaming devices, media devices, or other types of computing devices that include an integrated display touchscreen 114. Similar to the computing device, the touchscreen 114 of the touch-enabled device 112 has touch sensors to detect touch inputs on the touchscreen 114, such as when a user interacts with the device with a digital pen 116, or similar stylus-type device.

In aspects of replay of recorded touch input data, the recorded touch input data 118 can be recorded based on multiple instances of user inadvertent contact on one or more touch-enabled devices 112, which are devices independent of the computing device 102. In this example, a user holding the digital pen 116 makes inadvertent contact 120 on the touchscreen 114 of the touch-enabled device 112, such as with fingers and a side of the hand that is holding the digital pen 116. The inadvertent contact 120 on the touchscreen 114 can be represented as a heat map 122, and a digital representation 124 of the heat map can be recorded as the recorded touch input data 118. The heat map 122 is displayed as a collection of contacts of the palm (e.g., side of the hand) and/or the fingers, and can include varying areas of contact intensity.

The recorded touch input data 118 can be recorded as only unintentional contacts on the touch-enabled device 112 (or on several touch-enabled devices as shown and described with reference to FIG. 3). The palm postures of the many different users of the touch-enabled devices varies over the diverse demographics of the different users, such as between left and right-handed users, men and women, adults and children, and the like. These many variations can be captured as the recorded touch input data 118, and then applied to test the many different types of computing devices that have touchscreens on a device-agnostic basis. For example, the recorded touch input data 118 can then be applied as the unintentional contacts to test the palm rejection algorithm 110 of the touch detection application 108 for inadvertent contact rejection in the computing device 102. The recorded touch input data 118 can be applied as an objective, repeatable test of the palm rejection algorithm 110 of the touch detection application.

In this example system 100, a screen overlay device 126 receives the recorded touch input data 118, such as from a test manager device that obtains and stores the recorded touch input data. An example of a test manager device is shown and described further with reference to FIG. 2. The screen overlay device 126 can be placed over the integrated display touchscreen 104 of the computing device 102 to be tested, and the screen overlay device 126 generates the touch inputs 128 on the touchscreen 104 to test the palm rejection algorithm 110 for inadvertent contact rejection. The screen overlay device 126 is agnostic as to the different manufactured types of devices, and can be placed over any touchscreen-enabled device to replay the same signal pattern of the recorded touch input data 118 for repetitive, objective touchscreen testing of the different types of devices.

The recorded touch input data 118, applied as the touch inputs 128 by the screen overlay device 126, emulates touch patterns that approximate multiple instances of user inadvertent contact on the touchscreen 104 of the computing device 102. The screen overlay device 126 activates the touch sensors 106 of the touchscreen 104 with a grid of emitters that can each emit different capacitive levels of signal, such as to vary the intensity of the capacitance on a capacitive touchscreen. In implementations, the emitters of the screen overlay device 126 can initiate several levels (e.g., sixteen levels) of capacitive intensity to represent the variations in contact intensity of the heat map 122. Alternatively, the screen overlay device 126 can be implemented as a device that activates any type of the touch sensors 106 (e.g., capacitive, optical sensors for optical sensing, etc.). Additionally, the screen overlay device 126 can simulate the size and shape of any palm and/or fingers of users as the recorded touch input data 118, providing a repeatable, quantitative technique to measure palm rejection performance of any touchscreen-enabled computing device.

In addition to the intensity of the applied touch patterns, the recorded touch input data 118 can further emulate the motion of the touch patterns that approximate the multiple instances of user inadvertent contact on the touchscreen. For example, the screen overlay device 126 can apply the recorded touch input data 118 to emulate the motion of a user's hand across the touchscreen 104 as the user manipulates a digital pen to initiate inputs on the touchscreen 104 of the computing device 102. Further, the screen overlay device 126 can apply the recorded touch input data 118 to represent the intensity of harder or softer touch contacts on the touchscreen 104 of the computing device.

The touch detection application 108 of the computing device 102 that is being tested can receive sensor data of the touch inputs 128 from the touch sensors 106 as the recorded touch input data 118 is applied to test the palm rejection algorithm 110 of the touch detection application 108 for inadvertent contact rejection. The palm rejection algorithm 110 of the touch detection application 108 can then determine, for each of the touch inputs 128, whether a touch input is inadvertent contact with the touchscreen 104, and reject the touch inputs that are determined as the inadvertent contact with the touchscreen of the computing device 102.

Figure 2:
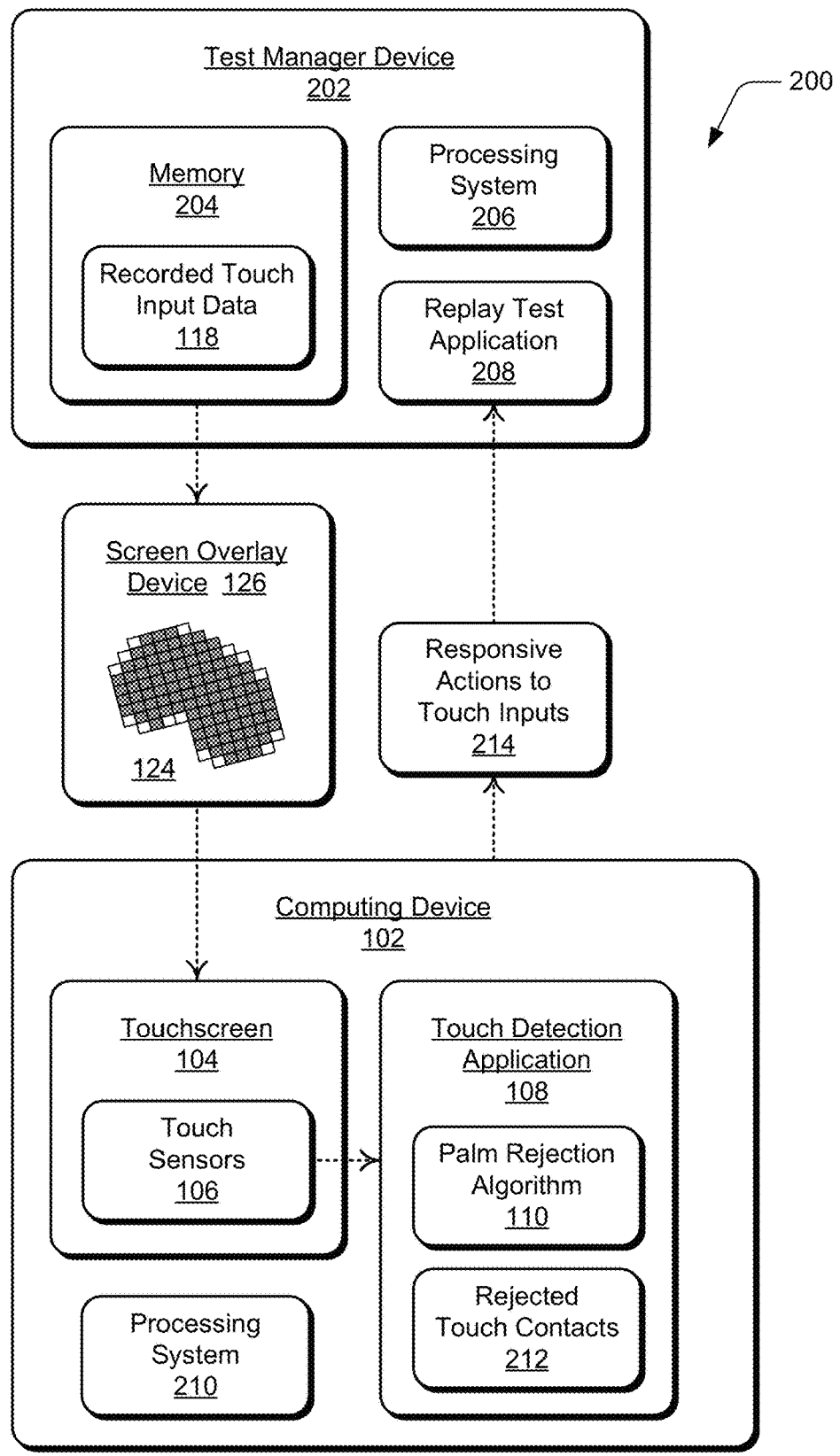
FIG. 2 further illustrates an example system in which aspects of replay of recorded touch input data can be implemented as described herein.

FIG. 2 illustrates an example system 200 in which aspects of replay of recorded touch input data can be implemented as described herein. The example system 200 includes the computing device 102 and the screen overlay device 126 that are shown and described with reference to FIG. 1. The example system 200 also includes a test manager device 202, which is another computing device in the system. The test manager device 202 includes memory 204 utilized to maintain the recorded touch input data 118. As a computing device, the test manager device 202 also has a processing system 206 and can be implemented with any number and combination of different components as further described with reference to the example device shown in FIG. 7.

The test manager device 202 implements a replay test application 208 as a software application or module, such as executable software instructions (e.g., computer-executable instructions) that are executable with the processing system 206 of the test manager device 202 to implement the described techniques for replay of recorded touch input data. The replay test application 208 can be stored on computer-readable storage memory (e.g., the device memory 204), such as any suitable memory device or electronic data storage implemented in the test manager device 202.

Similarly, the computing device 102 implements the touch detection application 108 as a software application or module, such as executable software instructions (e.g., computer-executable instructions) that are executable with a processing system 210 of the computing device 102. The touch detection application 108 can be stored on computer-readable storage memory (e.g., device memory), such as any suitable memory device or electronic data storage implemented in the computing device. In addition to memory and the processing system 210, the computing device 102 can be implemented with any number and combination of different components as further described with reference to the example device shown in FIG. 7. As noted above, the palm rejection algorithm 110 may be implemented as a component or module of the touch detection application 108. Alternatively, the palm rejection algorithm 110 may be implemented independent from the touch detection application 108. Additionally, the palm rejection algorithm 110 may be implemented in different configurations in different types of computing devices, such as in software, in firmware, in hardware, and/or in silicon of the computing device.

The replay test application 208 that is implemented by the test manager device 202 is designed to manage testing of the computing device 102 with the screen overlay device 126, as described with reference to FIG. 1. The replay test application 208 can initiate communication of the recorded touch input data 118 to the screen overlay device 126. The test manager device 202 then communicates the recorded touch input data 118 to the screen overlay device 126, which applies the recorded touch input data 118 as the touch inputs 128 on the touchscreen 104 of the computing device 102 to emulate touch patterns that approximate multiple instances of user inadvertent contact.

The screen overlay device 126, placed over the touchscreen 104 of the computing device 102, activates the touch sensors 106 of the touchscreen 104 with a grid of emitters that emit capacitive levels of signal (or other type of detectable signal), such as the digital representation 124 of the heat map 122 that represents the recorded touch input data 118. The touch detection application 108 of the computing device 102 receives the input from the touch sensors 106 of the touchscreen 104 when the touch contact is detected on the touchscreen 104. The palm rejection algorithm 110 can then determine whether a touch input on the touchscreen 104 is an input to initiate an action with the computing device, or whether the touch input is inadvertent contact on the touchscreen.

The palm rejection algorithm 110 can reject the touch inputs that are determined as inadvertent contact with the touchscreen as the rejected touch contacts 212. Otherwise, as noted above, an inadvertent contact may be processed through to the operating system of the computing device 102, and an unwanted device action may then be initiated by the computing device. In aspects of the described replay of recorded touch input data, the replay test application 208 is also implemented to monitor the computing device 102 for responsive actions 214 to the touch inputs that are not filtered as an inadvertent contact with the touchscreen 104 of the computing device 102. The responsive actions 214 to the touch inputs are an indication that the palm rejection algorithm 110 did not properly reject one or more of the test touch inputs as inadvertent contact with the touchscreen 104.

Figure 3:
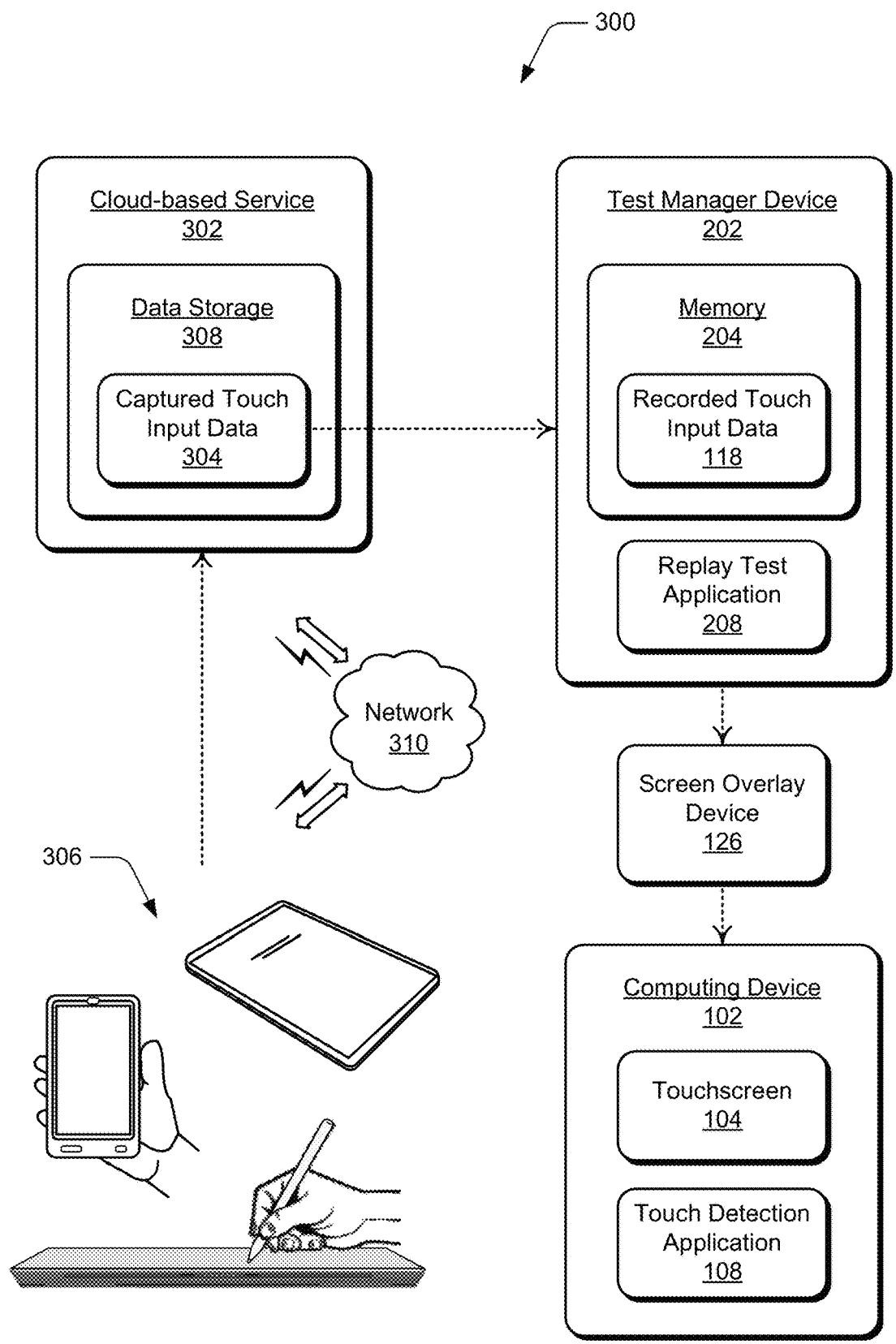
FIG. 3 illustrates an example system in which aspects of replay of recorded touch input data can be implemented as described herein.

FIG. 3 illustrates an example system 300 in which aspects of replay of recorded touch input data can be implemented as described herein. The example system 300 includes the devices that are shown and described with reference to FIGS. 1 and 2. Further, the example system 300 includes a cloud-based service 302 that collects and processes captured touch input data 304 as one or more touch-enabled devices 306 capture the touch input data on respective touchscreens of the touch-enabled devices while in use. The captured touch input data is communicated by the touch-enabled devices 306 to the cloud-based service 302 that maintains the data with data storage 308 as the captured touch input data 304, which can be communicated to the test manager device 202 and stored as the recorded touch input data 118 for replay and device testing.

The touch-enabled device 112 that is shown and described with reference to FIG. 1 is an example of the various touch-enabled devices 306, which may be any type of user devices, such as mobile phones, tablet devices, communication devices, gaming devices, media devices, and/or other types of computing devices that include an integrated display touchscreen 114. The captured touch input data 304 can be captured based on multiple instances of user inadvertent contact on one or more of the touch-enabled devices 306, which may be a broad range of devices with varying capabilities. The various touch-enabled devices 306 each include a data capture module (e.g., software, firmware, hardware, or any combination thereof) that captures user touch contact data on a touchscreen of a device in a consistent file format. In implementations, the captured touch input data 304 can also include environmental parameters, such as temperature, humidity, and the like that are recorded during unintentional contact and communicated by the touch-enabled devices 306 to the cloud-based service 302. The captured touch input data 304, which is then communicated to the test manager device 202 and stored as the recorded touch input data 118, can be utilized to recreate the environment more accurately when the recorded touch input data 118 is applied to test a device.

The data capture module is designed to serialize the captured data and communicate the data to the cloud-based service 302 for collection as the captured touch input data 304. It should be noted that the captured data may be use data based on users' interactions with the touch-enabled devices 306 during the normal course of using the devices, such as on an on-going daily basis. Alternatively or in addition, the captured data may be intentional user inadvertent contact with the devices to generate the captured touch input data 304. Additionally, the cloud-based service 302 and/or the test manager device 202 can process and/or format the captured touch input data 304, such as converting it to a text file or other type of data file that is understandable by the screen overlay device 126 when applied as the recorded touch input data 118.

The cloud-based service 302 that is accessible by the touch-enabled devices 306 includes the data storage 308 that may be implemented as any suitable memory, memory device, or electronic data storage for network-based storage. The cloud-based service 302 can also be implemented with server devices that are representative of one or multiple hardware server devices of the service. Further, the cloud-based service 302 can be implemented with various components, such as a processing system and memory, as well as with any number and combination of different components as further described with reference to the example device shown in FIG. 7. The cloud-based service 302 may also implement an instance of the replay test application 208, as described with reference to FIGS. 1 and 2, for features of replay of recorded touch input data.

The example system 300 also includes a network 310, and any of the devices, servers, and/or services described herein can communicate via the network, such as for data communication between the touch-enabled devices 306 and the cloud-based service 302, and between the cloud-based service 302 and the test manager device 202. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Example methods 400, 500, and 600 are described with reference to respective FIGS. 4-6 in accordance with one or more aspects of replay of recorded touch input data. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
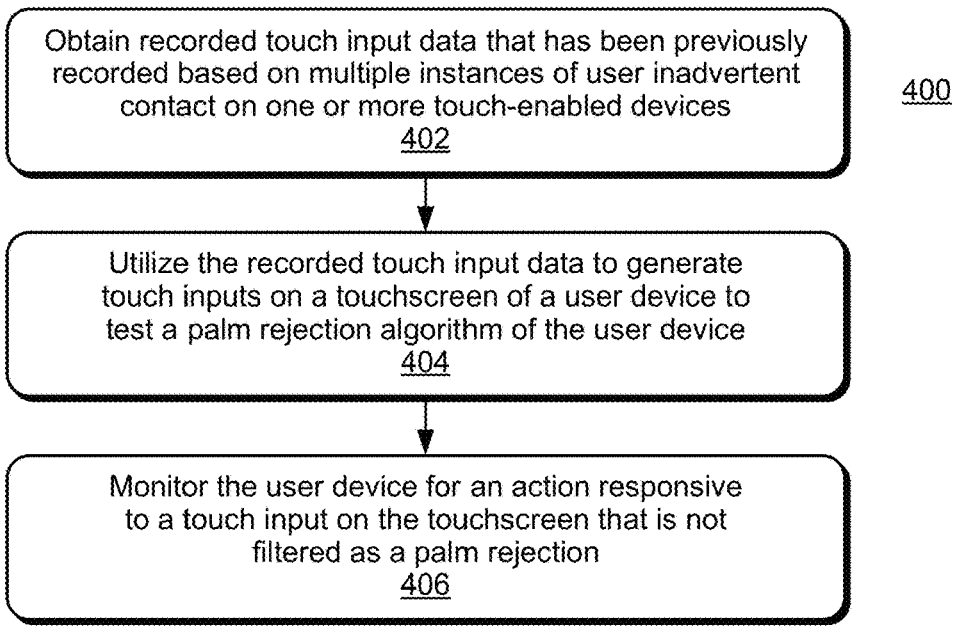
FIG. 4 illustrates an example method for replay of recorded touch input data in accordance with techniques described herein.

FIG. 4 illustrates an example method 400 of replay of recorded touch input data, and is generally described with reference to a computing device that is being tested using recorded touch input data. The order in which the method is described is not intended to be construed as a limitation, and any number or combination of the method operations can be performed in any order to implement a method, or an alternate method.

At 402, recorded touch input data is obtained, where the recorded touch input data has been previously recorded based on multiple instances of user inadvertent contact on one or more touch-enabled devices. For example, the screen overlay device 126 obtains the recorded touch input data 118 from the test manager device 202 that stores the recorded touch input data. In implementations, the recorded touch input data 118 is recorded based on multiple instances of user inadvertent contact on one or more touch-enabled devices 112, such as when a user holding the digital pen 116 makes inadvertent contact 120 on the touchscreen 114 of the touch-enabled device 112. Additionally, the test manager device 202 may obtain the captured touch input data 304 from the cloud-based service 302 that collects and stores captured touch input data received from the one or more touch-enabled devices 306. The captured touch input data 304 can be captured based on multiple instances of user inadvertent contact on one or more of the touch-enabled devices 306.

At 404, the recorded touch input data is utilized to generate touch inputs on a touchscreen of a user device to test a palm rejection algorithm of the user device. For example, the screen overlay device 126 is placed over the integrated display touchscreen 104 of the computing device 102 to be tested, and the screen overlay device 126 utilizes the recorded touch input data 118 to generate the touch inputs 128 on the touchscreen 104 to test the palm rejection algorithm 110 of the touch detection application 108 for inadvertent contact rejection. The recorded touch input data 118 is applied by the screen overlay device 126 as an objective, repeatable test of the palm rejection algorithm 110 of the touch detection application 108 in the computing device 102.

At 406, the user device is monitored for an action responsive to a touch input on the touchscreen that is not filtered as a palm rejection. For example, the palm rejection algorithm 110 of the touch detection application 108 determines whether a touch input on the touchscreen 104 is an input to initiate an action with the computing device 102, or whether the touch input is inadvertent contact on the touchscreen. The palm rejection algorithm 110 rejects the touch inputs as the rejected touch contacts 212 that are determined as inadvertent contact with the touchscreen 104. Otherwise, an inadvertent contact may be processed through to the operating system of the computing device 102, and an unwanted device action may then be initiated. The replay test application 208 monitors the computing device 102 for responsive actions 214 to the touch inputs that are not filtered as inadvertent contact with the touchscreen 104 of the device. The responsive actions to the touch inputs are an indication that the palm rejection algorithm did not properly reject one or more of the test touch inputs as inadvertent contact with the touchscreen.

Figure 5:
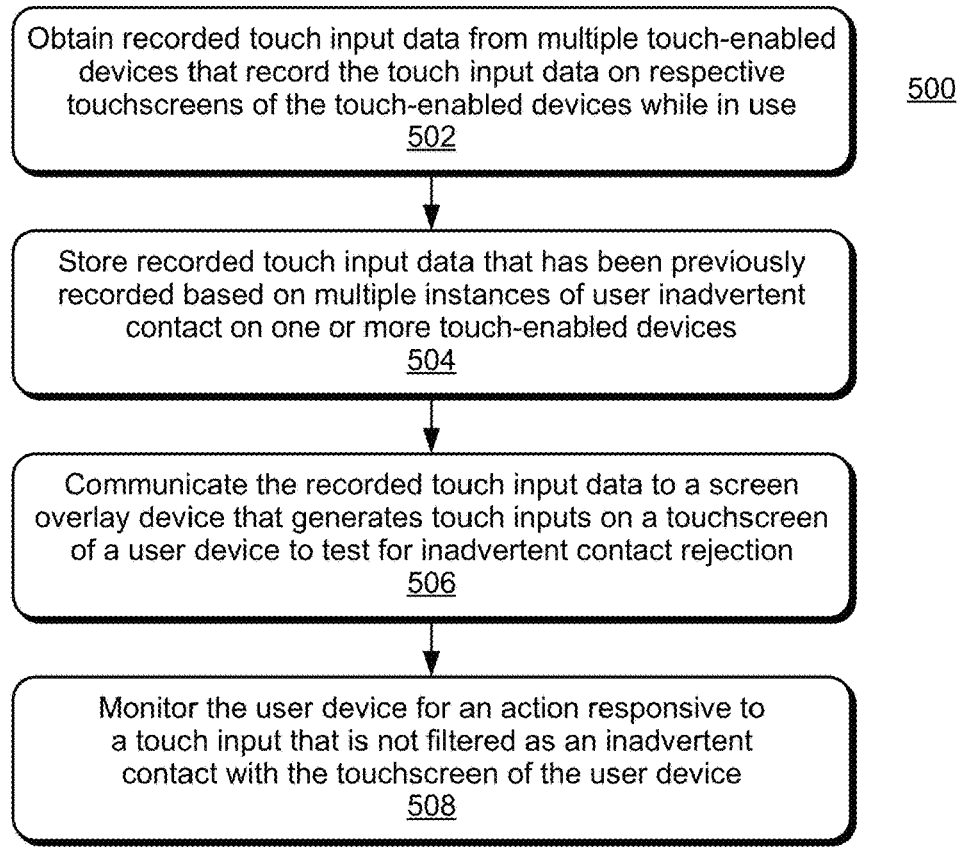
FIG. 5 illustrates an example method for replay of recorded touch input data in accordance with techniques described herein.

FIG. 5 illustrates an example method 500 of replay of recorded touch input data, and is generally described with reference to a computing device that tests user devices with recorded touch input data. The order in which the method is described is not intended to be construed as a limitation, and any number or combination of the method operations can be performed in any order to implement a method, or an alternate method.

At 502, recorded touch input data is obtained from multiple touch-enabled devices that record the touch input data on respective touchscreens of the touch-enabled devices while in use. For example, the test manager device 202 obtains the captured touch input data 304 from the cloud-based service 302 that collects and stores captured touch input data received from the one or more touch-enabled devices 306. The captured touch input data 304 can be captured based on multiple instances of user inadvertent contact on one or more of the touch-enabled devices 306, and then the captured touch input data is communicated by the touch-enabled devices 306 to the cloud-based service 302 that maintains the captured touch input data 304.

At 504, recorded touch input data is stored, where the recorded touch input data has been previously recorded based on multiple instances of user inadvertent contact on one or more touch-enabled devices. For example, the test manager device 202 includes the memory 204 to store the recorded touch input data 118, such as received from the cloud-based service 302 that collects and stores the captured touch input data 304 received from the one or more touch-enabled devices 306. In implementations, the recorded touch input data 118 is recorded based on multiple instances of user inadvertent contact on the one or more touch-enabled devices 306 (an example of which is the touch-enabled device 112), such as when a user holding the digital pen 116 makes inadvertent contact 120 on the touchscreen 114 of the touch-enabled device 112.

At 506, the recorded touch input data is communicated to a screen overlay device that generates touch inputs on a touchscreen of a user device to test the user device for inadvertent contact rejection. For example, the replay test application 208 implemented by the test manager device 202 manages testing of the computing device 102 and initiates communication of the recorded touch input data 118 to the screen overlay device 126. The test manager device 202 then communicates the recorded touch input data 118 to the screen overlay device 126, which applies the recorded touch input data 118 as the touch inputs 128 on the touchscreen 104 of the computing device 102 to emulate touch patterns that approximate multiple instances of user inadvertent contact to test the computing device 102 for inadvertent contact rejection. The replay test application 208 is designed to test the palm rejection algorithm 110 of the touch detection application 108 of one or more computing devices for inadvertent contact rejection using the recorded touch input data 118. The replay test application 208 can initiate the recorded touch input data 118 being applied as an objective, repeatable test of the palm rejection algorithm 110 of the computing device 102 for the inadvertent contact rejection.

At 508, the user device is monitored for an action responsive to a touch input that is not filtered as an inadvertent contact with the touchscreen of the user device. For example, the replay test application 208 that is implemented by the test manager device 202 monitors the computing device 102 for responsive actions 214 to the touch inputs that are not filtered as inadvertent contact with the touchscreen 104 of the computing device. The responsive actions 214 to the touch inputs are an indication that the palm rejection algorithm 110 of the touch detection application 108 did not properly reject one or more of the test touch inputs as inadvertent contact with the touchscreen 104 of the computing device 102. The palm rejection algorithm 110 of the touch detection application 108 determines whether a touch input on the touchscreen 104 is an input to initiate an action with the computing device 102, or whether the touch input is inadvertent contact on the touchscreen 104. The palm rejection algorithm 110 rejects the touch inputs as the rejected touch contacts 212 that are determined as inadvertent contact with the touchscreen. Otherwise, an inadvertent contact may be processed through to the operating system of the computing device 102, and an unwanted device action may then be initiated.

Figure 6:
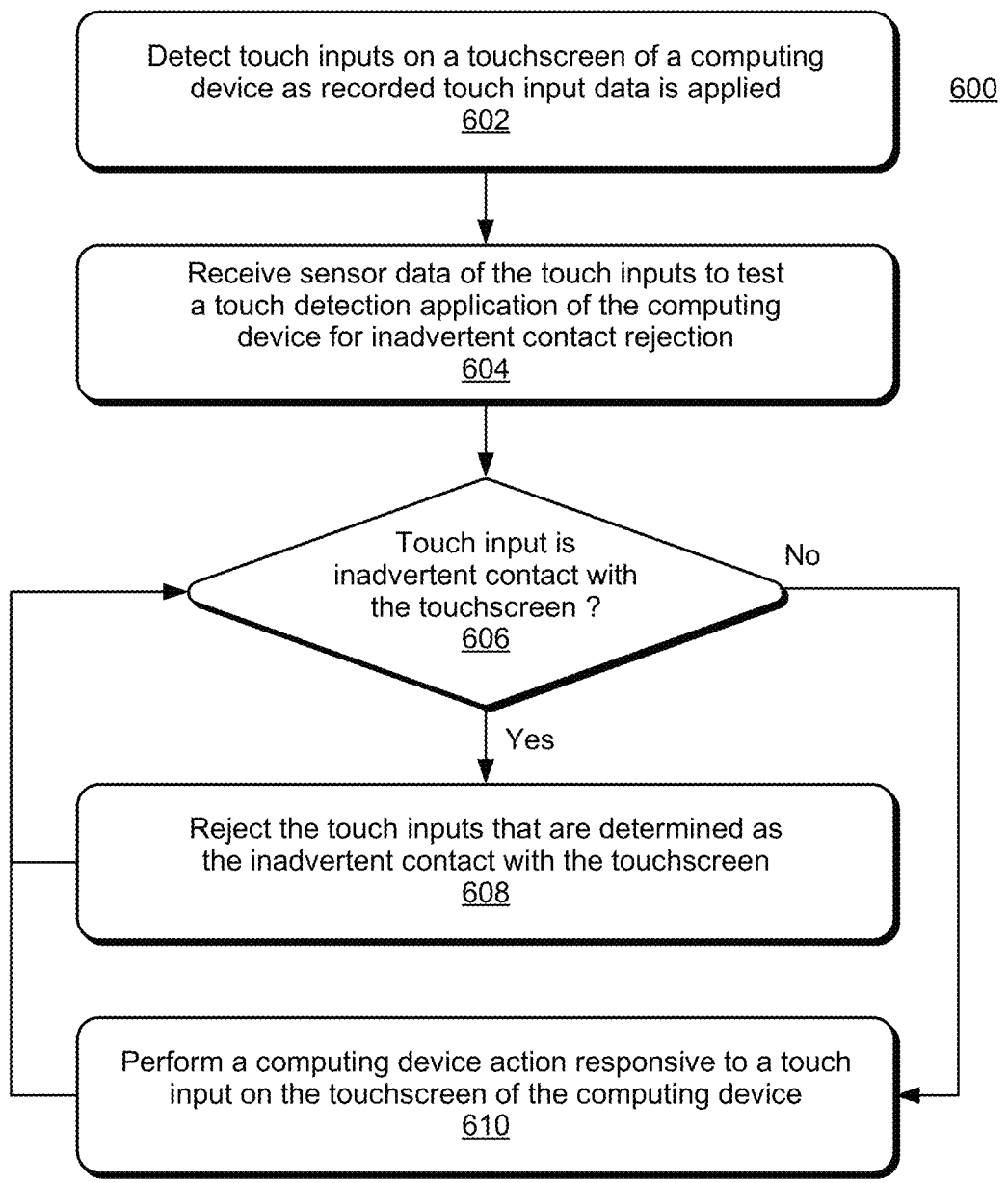
FIG. 6 illustrates an example method for replay of recorded touch input data in accordance with techniques described herein.

FIG. 6 illustrates an example method 600 of replay of recorded touch input data, and is generally described with reference to a computing device being tested using recorded touch input data. The order in which the method is described is not intended to be construed as a limitation, and any number or combination of the method operations can be performed in any order to implement a method, or an alternate method.

At 602, touch inputs are detected on a touchscreen of a computing device as recorded touch input data is applied. For example, the computing device 102 has an integrated display touchscreen 104 with touch sensors 106 that detect touch inputs on the touchscreen as the touch inputs 128 are generated and applied by the screen overlay device 126. The recorded touch input data 118 is previously recorded based on multiple instances of user inadvertent contact on one or more touch-enabled devices 306, of which the touch-enabled device 112 is an example. The recorded touch input data 118 emulates touch patterns that approximate the multiple instances of user inadvertent contact on the touchscreen 104 of the computing device 102, and the recorded touch input data 118 further emulates motion and/or intensity of the touch patterns that approximate the multiple instances of user inadvertent contact on the touchscreen.

At 604, sensor data of the touch inputs is received as the recorded touch input data is applied to test the touch detection application of the computing device for inadvertent contact rejection. For example, the touch detection application 108 of the computing device 102 receives sensor data of the touch inputs from the touch sensors 106 as the recorded touch input data 118 is applied to test the palm rejection algorithm 110 of the touch detection application 108 for inadvertent contact rejection. In implementations, the recorded touch input data 118 is only unintentional contacts recorded on the one or more touch-enabled devices 306, and the recorded touch input data 118 is applied as the unintentional contacts to test the palm rejection algorithm 110 of the touch detection application 108 for the inadvertent contact rejection. The recorded touch input data 118 is applied by the screen overlay device 126 as an objective, repeatable test of the palm rejection algorithm 110 of the touch detection application 108 for the inadvertent contact rejection.

At 606, a determination is made as to whether a touch input (for each of the touch inputs) is inadvertent contact with the touchscreen. For example, the palm rejection algorithm 110 of the touch detection application 108 determines whether a touch input 128 is inadvertent contact with the touchscreen 104 of the computing device 102. If a touch input is determined as inadvertent contact with the touchscreen of the computing device (i.e., "Yes" from 606), then at 608, the touch input that is determined as the inadvertent contact with the touchscreen is rejected. For example, the palm rejection algorithm 110 of the touch detection application 108 rejects a touch input as a rejected touch contact 212 that is determined as inadvertent contact with the touchscreen 104 of the computing device 102. If a touch input is not determined as inadvertent contact with the touchscreen of the computing device (i.e., "No" from 606), then at 610, the computing device performs an action responsive to the touch input on the touchscreen of the computing device. For example, an inadvertent contact with the touchscreen 104 of the computing device 102 that is not filtered by the palm rejection algorithm 110 may be processed through to the operating system of the computing device 102 as a failed palm rejection, and an unwanted device action may then be initiated, such as a cursor movement, button selection, or other type of user interface initiated action.

Figure 7:
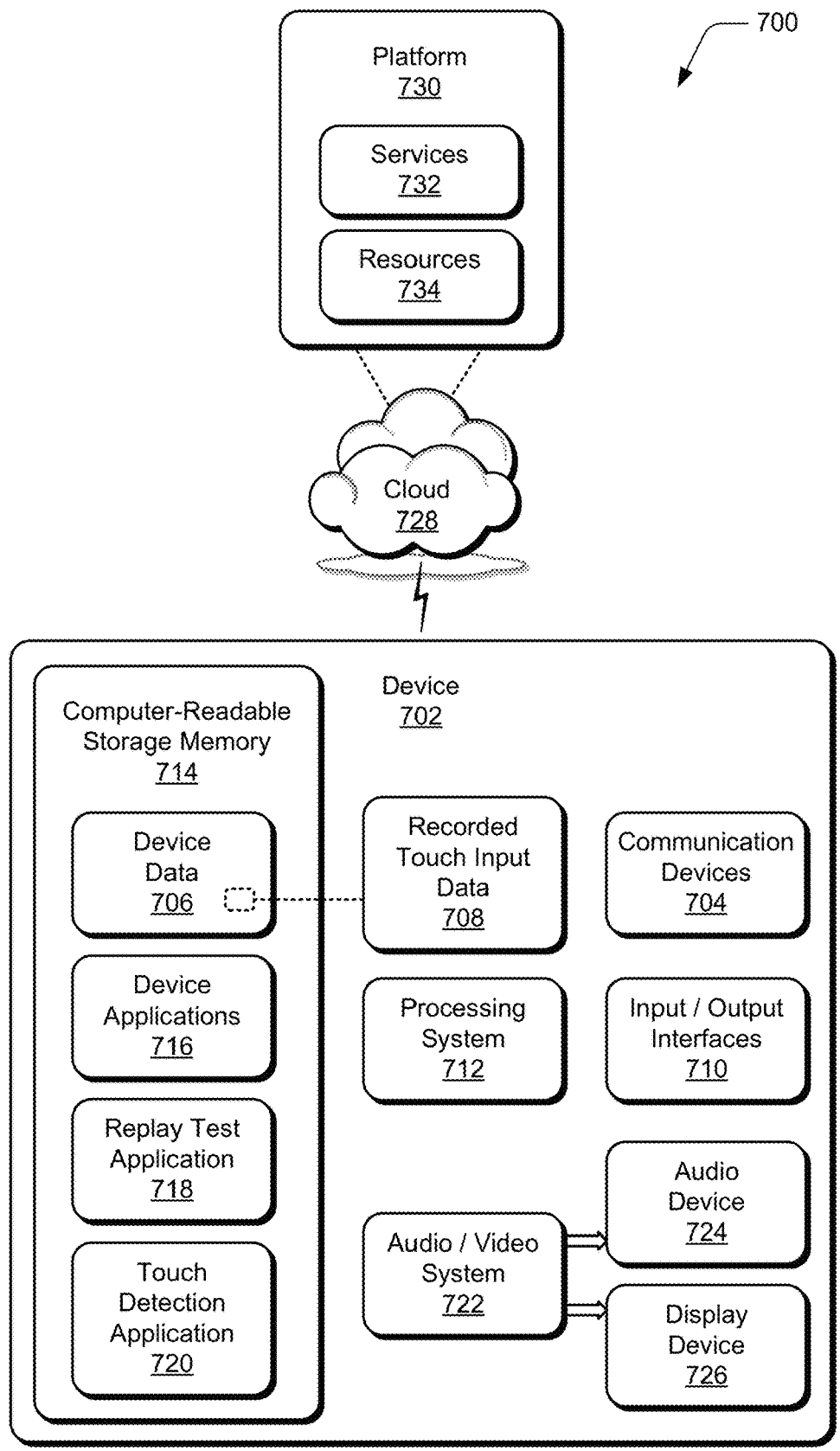
FIG. 7 illustrates an example system with an example device that can implement replay of recorded touch input data as described herein.

FIG. 7 illustrates an example system 700 that includes an example device 702, which can implement aspects of replay of recorded touch input data. The example device 702 can be implemented as any of the computing devices, user devices, and server devices described with reference to the previous FIGS. 1-6, such as any type of mobile device, wearable device, client device, mobile phone, tablet device, computing, communication, entertainment, gaming, media playback, and/or other type of device. For example, the computing devices and server devices described herein may be implemented as the example device 702 or with various components of the example device.

The device 702 includes communication devices 704 that enable wired and/or wireless communication of device data 706, such as recorded touch input data 708, and any other type of data related to replay of recorded touch input data. Additionally, the device data can include any type of audio, video, and/or image data. The communication devices 704 can also include transceivers for cellular phone communication and for network data communication. The device 702 can be a wireless communication-enabled device and include different wireless radio systems, such as for Wi-Fi, Bluetooth™, Mobile Broadband, LTE, as well as 802.11a/b/g/n/ac network connectivity technologies, and/or any other wireless communication system or format. Generally, the device 702 can implement one or more wireless communication systems that each include a radio device, antenna, and chipset for wireless communication with other devices, networks, and services.

The device 702 also includes input/output (I/O) interfaces 710, such as data network interfaces that provide connection and/or communication links between the device, data networks, and other devices described herein. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 702 includes a processing system 712 that may be implemented at least partially in hardware, such as with any type of microprocessors, controllers, and the like that process executable instructions. The processing system can include components of an integrated circuit, a programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 702 may further include any type of a system bus or other data and command transfer system that couples the various components within the device. A system bus can include any one or combination of different bus structures and architectures, as well as control and data lines.

The device 702 also includes a computer-readable storage memory 714, such as data storage devices that can be accessed by a computing device, and that provide persistent storage of data and executable instructions (e.g., software applications, programs, functions, and the like). Examples of the computer-readable storage memory 714 include volatile memory and non-volatile memory, fixed and removable media devices, and any suitable memory device or electronic data storage that maintains data for computing device access. The computer-readable storage memory can include various implementations of random access memory (RAM) (e.g., the DRAM and battery-backed RAM), read-only memory (ROM), flash memory, and other types of storage media in various memory device configurations.

The computer-readable storage memory 714 provides storage of the device data 706 and various device applications 716, such as an operating system that is maintained as a software application with the computer-readable storage memory and executed by the processing system 712. In this example, the device applications include a replay test application 718 and/or a touch detection application 720 that implement features of replay of recorded touch input data, such as when the example device 702 is implemented as the computing device 102 and/or as the test manager device 202 described herein with reference to FIGS. 1-6. An example of the replay test application 718 is the replay test application 208 implemented by the test manager device 202 as described with reference to FIGS. 2 and 3. Further, an example of the touch detection application 720 is the touch detection application 108 implemented by the computing device 102, as described with reference to FIGS. 1-6.

The example device 702 also includes an audio and/or video system 722 that generates audio data for an audio device 724 and/or generates display data for a display device 726. The audio device and/or the display device include any devices that process, display, and/or otherwise render audio, video, display, and/or image data. In implementations, the audio device and/or the display device are integrated components of the example device 702. Alternatively, the audio device and/or the display device are external, peripheral components to the example device.

In aspects of replay of recorded touch input data, at least part of the techniques described herein may be implemented in a distributed system, such as over a "cloud" 728 in a platform 730. The cloud 728 includes and/or is representative of the platform 730 for services 732 and/or resources 734. The platform 730 abstracts underlying functionality of hardware, such as server devices (e.g., included in the services 732) and/or software resources (e.g., included as the resources 734), and connects the example device 702 with other devices, servers, etc. The resources 734 may also include applications and/or data that can be utilized while computer processing is executed on servers that are remote from the example device 702. Additionally, the services 732 and/or the resources 734 may facilitate subscriber network services, such as over the Internet, a cellular network, or Wi-Fi network. The platform 730 may also serve to abstract and scale resources to service a demand for the resources 734 that are implemented via the platform, such as in an interconnected device embodiment with functionality distributed throughout the system 700. For example, the functionality may be implemented in part at the example device 702 as well as via the platform 730 that abstracts the functionality of the cloud.

Although aspects of replay of recorded touch input data have been described in language specific to features and/or methods, the appended claims are not necessarily limited to the specific features or methods described. Rather, the specific features and methods are disclosed as example implementations of replay of recorded touch input data, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A computing device implemented for replay of recorded touch input data, the computing device comprising: a touchscreen having sensors enabled to detect touch inputs on the touchscreen; a processor system configured to execute a touch detection application that is implemented to: receive sensor data of the touch inputs as the recorded touch input data is applied to test the touch detection application for inadvertent contact rejection, the recorded touch input data having been previously recorded based on multiple instances of user inadvertent contact on one or more touch-enabled devices; determine, for each of the touch inputs, whether a touch input is inadvertent contact with the touchscreen; and reject the touch inputs that are determined as the inadvertent contact with the touchscreen.

Alternatively or in addition to the above described computing device, any one or combination of: a screen overlay device receives the recorded touch input data and generates the touch inputs on the touchscreen to test the touch detection application for the inadvertent contact rejection. The recorded touch input data is only unintentional contacts recorded on the one or more touch-enabled devices, and the recorded touch input data is applied as the unintentional contacts to test the touch detection application for the inadvertent contact rejection. The touch detection application includes a palm rejection algorithm, and the recorded touch input data is applied as the unintentional contacts to test the palm rejection algorithm. The recorded touch input data is recorded using the one or more touch-enabled devices that are independent of the computing device. The recorded touch input data emulates touch patterns that approximate the multiple instances of user inadvertent contact on the touchscreen. The recorded touch input data further emulates motion of the touch patterns that approximate the multiple instances of user inadvertent contact on the touchscreen. The recorded touch input data further emulates intensity of the touch patterns that approximate the multiple instances of user inadvertent contact on the touchscreen. The recorded touch input data is applied is an objective, repeatable test of the touch detection application for the inadvertent contact rejection.

A computing device implemented for replay of recorded touch input data, the computing device comprising: a memory configured to store recorded touch input data that has been previously recorded based on multiple instances of user inadvertent contact on one or more touch-enabled devices; a processor system configured to execute a replay test application that is implemented to test one or more user devices for inadvertent contact rejection using the recorded touch input data, the replay test application configured to: communicate the recorded touch input data to a screen overlay device that generates touch inputs on a touchscreen of a user device; and monitor the user device for an action responsive to a touch input that is not filtered as an inadvertent contact with the touchscreen of the user device.

Alternatively or in addition to the above described computing device, any one or combination of: the screen overlay device generates the touch inputs on the touchscreen of the user device to test a touch detection application of the user device for the inadvertent contact rejection. The replay test application is configured to apply the recorded touch input data as an objective, repeatable test of the touch detection application of the user device for the inadvertent contact rejection. The recorded touch input data is only unintentional contacts recorded on the one or more touch-enabled devices, and the recorded touch input data is applied as the unintentional contacts to test the touch detection application of the user device for the inadvertent contact rejection. The touch detection application includes a palm rejection algorithm, and the recorded touch input data is applied as the unintentional contacts to test the palm rejection algorithm. The recorded touch input data emulates touch patterns that approximate the multiple instances of user inadvertent contact on the touchscreen of the user device. The recorded touch input data further emulates motion of the touch patterns that approximate the multiple instances of user inadvertent contact on the touchscreen of the user device. The recorded touch input data further emulates intensity of the touch patterns that approximate the multiple instances of user inadvertent contact on the touchscreen of the user device. Wherein the one or more touch-enabled devices record the touch input data on respective touchscreens of the touch-enabled devices while in use; the recorded touch input data is communicated by the touch-enabled devices to a cloud-based service that maintains the recorded touch input data; and the computing device is configured to receive the recorded touch input data from the cloud-based service to store in the memory.

A method for replay of recorded touch input data, the method comprising: obtaining recorded touch input data that has been previously recorded based on multiple instances of user inadvertent contact on one or more touch-enabled devices; utilizing the recorded touch input data to generate touch inputs on a touchscreen of a user device to test a palm rejection algorithm of the user device; and monitoring the user device for an action responsive to a touch input on the touchscreen that is not filtered as a palm rejection.

Alternatively or in addition to the above described method, any one or combination of: the recorded touch input data emulates touch patterns that approximate the multiple instances of user inadvertent contact on the touchscreen of the user device.

The invention claimed is:

1. A computing system implemented for replay of recorded touch input data, the computing system comprising:
   a screen overlay device configured to receive recorded touch input data and generate touch inputs on a touchscreen having sensors enabled to detect touch inputs on the touchscreen;
   a touchscreen device including the touchscreen and a processor system configured to execute a touch detection application that is implemented to:
   receive sensor data of the touch inputs as the recorded touch input data is applied by the screen overlay device to test the touch detection application for inadvertent contact rejection, the recorded touch input data having been previously recorded based on multiple instances of user inadvertent contact on one or more touch-enabled devices;
   determine, for each of the touch inputs, whether a touch input is inadvertent contact with the touchscreen; and
   reject the touch inputs that are determined as the inadvertent contact with the touchscreen.

2. The computing system as recited in claim 1, wherein the recorded touch input data is only unintentional contacts recorded on the one or more touch-enabled devices, and the recorded touch input data is applied as the unintentional contacts to test the touch detection application for the inadvertent contact rejection.

3. The computing system as recited in claim 2, wherein the touch detection application includes a palm rejection algorithm, and the recorded touch input data is applied as the unintentional contacts to test the palm rejection algorithm.

4. The computing system as recited in claim 1, wherein the recorded touch input data is recorded using the one or more touch-enabled devices that are independent of the computing system.

5. The computing system as recited in claim 1, wherein the recorded touch input data emulates touch patterns that approximate the multiple instances of user inadvertent contact on the touchscreen.

6. The computing system as recited in claim 5, wherein the recorded touch input data further emulates motion of the touch patterns that approximate the multiple instances of user inadvertent contact on the touchscreen.

7. The computing system as recited in claim 5, wherein the recorded touch input data further emulates intensity of the touch patterns that approximate the multiple instances of user inadvertent contact on the touchscreen.

8. The computing system as recited in claim 1, wherein the recorded touch input data is applied is an objective, repeatable test of the touch detection application for the inadvertent contact rejection.

9. A computing device implemented for replay of recorded touch input data, the computing device comprising:
   a memory configured to store recorded touch input data that has been previously recorded based on multiple instances of user inadvertent contact on one or more touch-enabled devices;
   a processor system configured to execute a replay test application that is implemented to test one or more user devices for inadvertent contact rejection using the recorded touch input data, the replay test application configured to:
   communicate the recorded touch input data to a screen overlay device that generates touch inputs on a touchscreen of a user device, the user device being separate from the screen overlay device; and
   monitor the user device for an action responsive to a touch input that is not filtered as an inadvertent contact with the touchscreen of the user device.

10. A computing device as recited in claim 9, wherein the screen overlay device generates the touch inputs on the touchscreen of the user device to test a touch detection application of the user device for the inadvertent contact rejection.

11. A computing device as recited in claim 10, wherein the replay test application is configured to apply the recorded touch input data as an objective, repeatable test of the touch detection application of the user device for the inadvertent contact rejection.

12. A computing device as recited in claim 10, wherein the recorded touch input data is only unintentional contacts recorded on the one or more touch-enabled devices, and the recorded touch input data is applied as the unintentional contacts to test the touch detection application of the user device for the inadvertent contact rejection.

13. A computing device as recited in claim 12, wherein the touch detection application includes a palm rejection algorithm, and the recorded touch input data is applied as the unintentional contacts to test the palm rejection algorithm.

14. A computing device as recited in claim 9, wherein the recorded touch input data emulates touch patterns that approximate the multiple instances of user inadvertent contact on the touchscreen of the user device.

15. A computing device as recited in claim 14, wherein the recorded touch input data further emulates motion of the touch patterns that approximate the multiple instances of user inadvertent contact on the touchscreen of the user device.

16. A computing device as recited in claim 14, wherein the recorded touch input data further emulates intensity of the touch patterns that approximate the multiple instances of user inadvertent contact on the touchscreen of the user device.

17. A computing device as recited in claim 9, wherein:
 the one or more touch-enabled devices record the touch input data on respective touchscreens of the touch-enabled devices while in use;
 the recorded touch input data is communicated by the touch-enabled devices to a cloud-based service that maintains the recorded touch input data; and
 the computing device is configured to receive the recorded touch input data from the cloud-based service to store in the memory.

18. A method for replay of recorded touch input data, the method comprising:
 obtaining recorded touch input data that has been previously recorded based on multiple instances of user inadvertent contact on one or more touch-enabled devices;
 utilizing the recorded touch input data with a screen overlay device configured to generate touch inputs on a touchscreen of a user device to test a palm rejection algorithm of the user device, the user device being separate from the screen overlay device; and
 monitoring the user device for an action responsive to a touch input on the touchscreen that is not filtered as a palm rejection.

19. A method as recited in claim 18, wherein the recorded touch input data emulates touch patterns that approximate the multiple instances of user inadvertent contact on the touchscreen of the user device.

20. A method as recited in claim 18, wherein the recorded touch input data is only unintentional contacts recorded on the one or more touch-enabled devices, and the recorded touch input data is utilized with the screen overlay device to apply unintentional contacts to the touchscreen of the user device to test a touch detection application executing thereon for inadvertent contact rejection.

\* \* \* \* \*